Oct. 25, 1949. A. N. CRISTOFANI ET AL 2,485,701
EMERGENCY FUEL TANK
Filed March 10, 1947 2 Sheets-Sheet 1
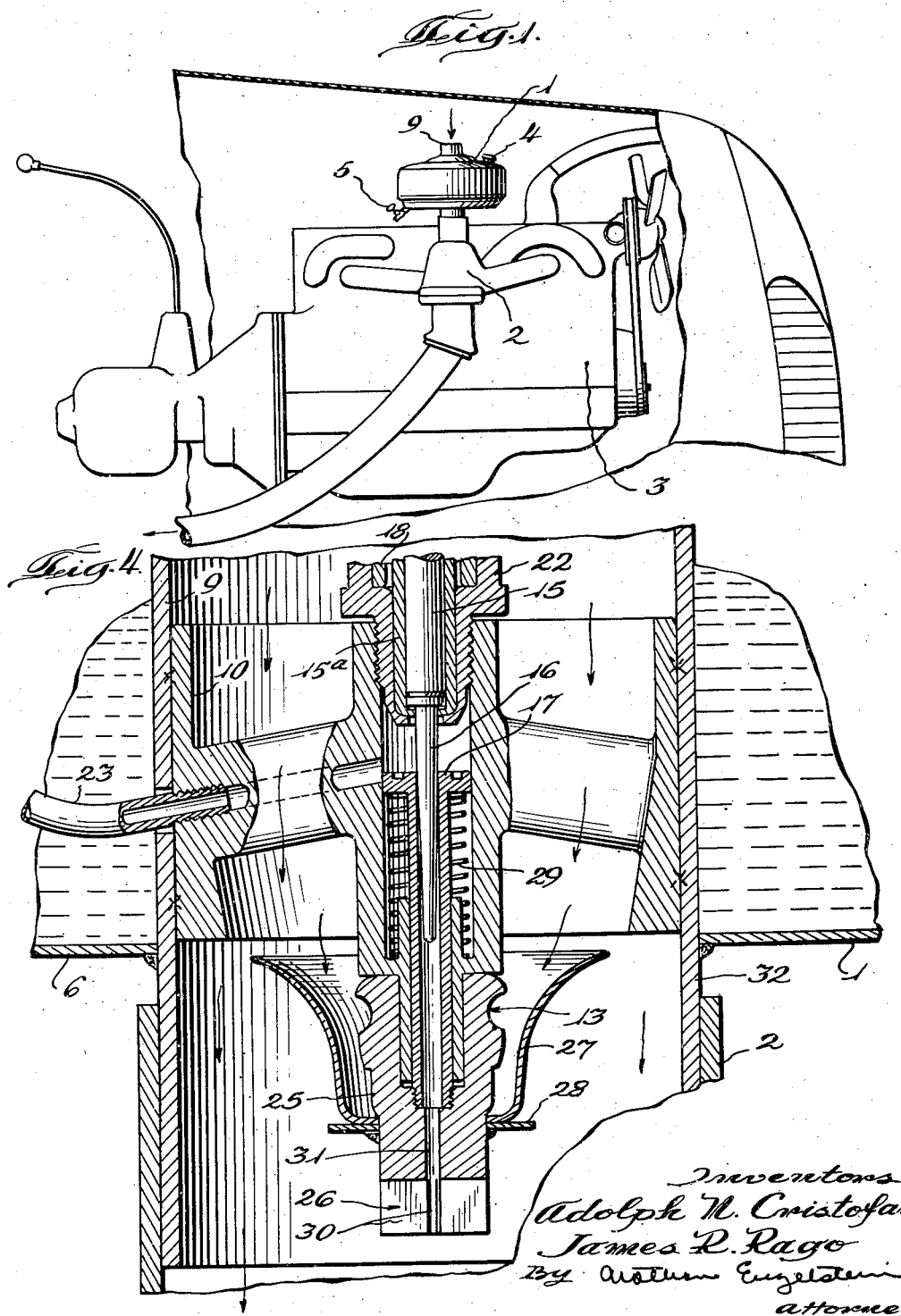

Oct. 25, 1949.  A. N. CRISTOFANI ET AL  2,485,701
EMERGENCY FUEL TANK
Filed March 10, 1947  2 Sheets-Sheet 2
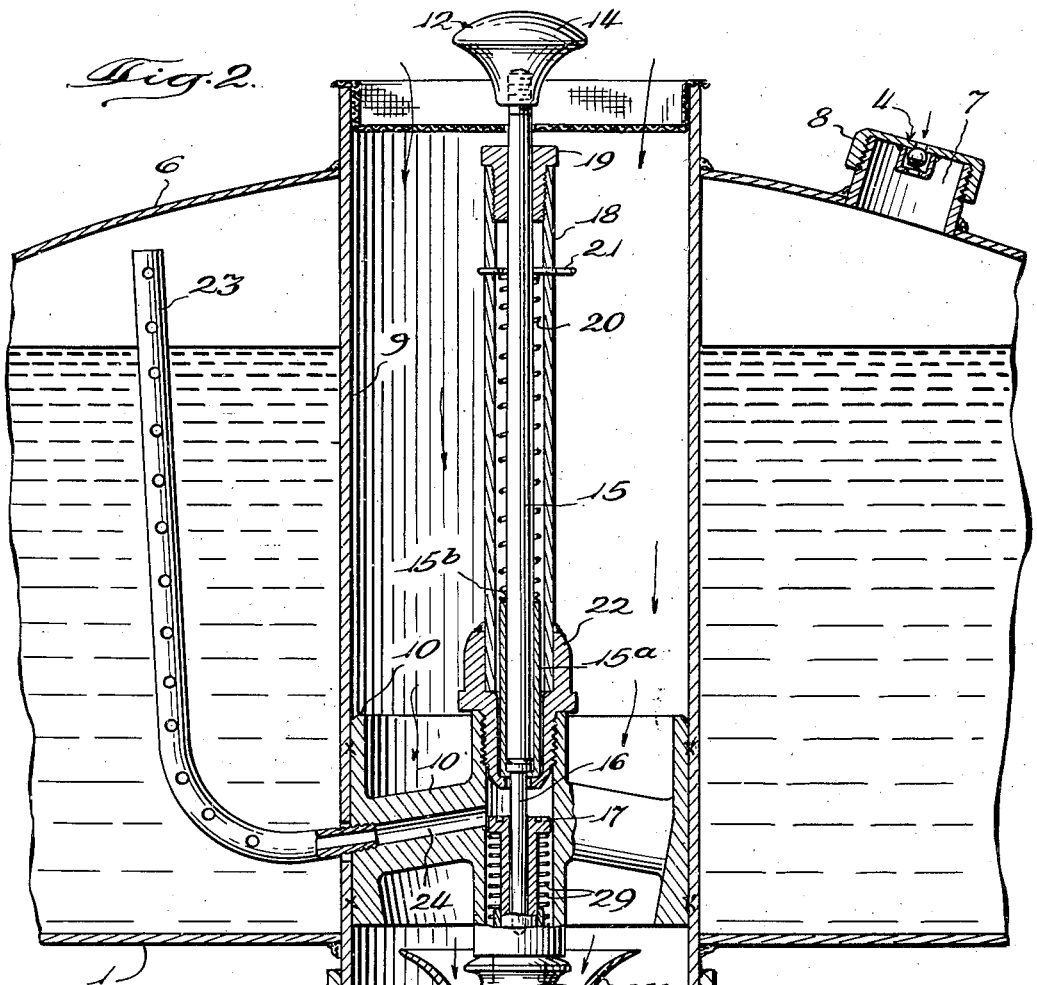
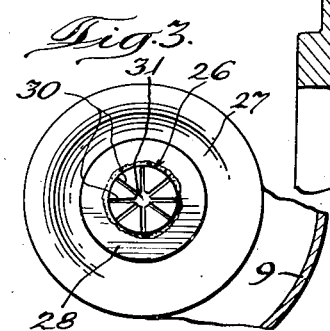
Inventors.
Adolph N. Cristofani
James R. Rago
By Nathan Engelstein
attorney Patented Oct. 25, 1949

2,485,701

UNITED STATES PATENT OFFICE 2,485,701

EMERGENCY FUEL TANK

Adolph N. Cristofani and James R. Rago,
Melrose Park, Ill.

Application March 10, 1947, Serial No. 733,502

1 Claim. (Cl. 261—69)

This invention relates to an emergency fuel tank and more particularly refers to a fuel reserve tank containing fuel for use with internal combustion engines.

One object of this invention is to provide an emergency gasoline tank to be used when the regular supply of gasoline is exhausted.

Another object of this invention is to provide means for feeding gasoline directly into the carburetor of an internal combustion engine in the event of failure of fuel pump or broken or clogged fuel lines.

A further object of this invention is to provide an emergency gasoline tank which will supply gasoline to the cylinders of the internal combustion engine when vapor lock occurs.

A further object is to provide a reserve fuel tank having a feed valve responsive to the suction of the gasoline engine.

Other objects and advantages of the invention relate to various details of construction and novel arrangements of the parts as will be more fully set forth in the detailed description to follow.

Referring to the drawings:

Figure 1 is a side elevational view of an internal combustion engine showing the emergency fuel tank mounted on the air intake side of a typical down draft carburetor.

Figure 2 is a sectional view of the emergency fuel tank showing in detail the construction of the tank.

Figure 3 is an elevational view of the air catch taken on line 3—3 of Figure 2.

Figure 4 is an enlarged sectional view of the lower portion of the tank showing in greater detail the structure of the automatic feed valve through which the fuel is fed into the carburetor.

Referring to Figure 1 of the drawing, I designates the emergency fuel tank mounted on down draft carburetor 2, connected to internal combustion engine 3. At the top of emergency fuel tank I is check valve 4 through which air from the atmosphere enters as fuel is drained from the tank. At the bottom of emergency gasoline tank I is drain cock 5 through which may be drained water, sediment and other non-fuel components which may collect in the bottom of the tank.

When not in use the emergency fuel tank is ordinarily not connected to the engine, but stored in the trunk or other convenient place in the vehicle. When an emergency arises and the tank is needed, the air filter at the top of the carburetor of the automobile engine is removed and the emergency gasoline tank is mounted in its place.

Referring to Figure 2 of the drawing, the body of the emergency fuel tank 6 is shaped generally in the form of a doughnut; that is, a tank with a throat 9 centrally and vertically disposed and running the full height of the tank. The walls on the tank are preferably made of sheet metal, approximately 16 gage thickness and welded at the joints. A tank containing approximately 5 quarts of fuel has been found to be a convenient size for use in the ordinary gasoline engine. Fuel is poured into the tank through opening 7 by first unscrewing and removing cap 8. After the tank is filled with fuel, cap 8 is screwed on to avoid gasoline spillage from the tank. In the center of the emergency tank I is a hollow throat 9, down through which, as indicated by the arrows, air flows into the carburetor. As fuel is fed into the carburetor a partial vacuum would normally be created in the tank which we have found would retard an even flow of fuel to the engine, therefore, we have provided a ball check valve 4 which permits air to zow into the tank but avoids the spilling of gasoline. A screen may be placed on top of throat 9 to prevent foreign objects from entering the throat.

Disposed vertically in the center of throat 9 and supported by casting 10 is primer 12 and automatic valve 13 for feeding fuel into the carburetor. Frequently, it is necessary or desirable to prime the motor particularly for starting the engine, by supplying small amount of raw gasoline into the carburetor. Priming is accomplished by lifting knob 14 which opens a valve and releases gasoline into the carburetor. Attached to knob 14 and extending vertically downward is a long metal shaft 15. Surrounding the metal shaft 15 at its lower extremity is a tubular member 15a which is welded on to the shaft 15 at 15b. Tubular member 15a is crimped over a head portion on the tapered pin 16. Tapered pin 16 is slightly loose and can easily align itself for perfect seating on the seat 17, thereby sealing off the flow of fuel from the tank into the carburetor. Surrounding the shaft 15 is hollow tube 18, the top of which is sealed by gland 19. In order to provide tension on the primer to maintain it in closed position unless mechanical force is exerted to raise the knob 14, a spring 20 is disposed intermediate the shaft 15 and the tube 18. The top of the spring 20 is held in position by pin 21 or any other suitable obstruction, and the bottom of the spring 20 rests against the upper portion of the tubular member 15a thereby constantly keeping the primer 12 closed.

The bottom of hollow tube 18 is secured to casting 10 by means of bushing 22. The bottom end of bushing 22 acts as a seat on which rests the tubular member 15a, thereby sealing off the upward flow of gasoline into hollow tube 18.

Fuel from tank 6 flows through a perforated copper tube 23 extending the height of tank 6, and thence through conduit 24 in bracket 10. Below bushing 22 is movable seat 17, the upper portion of which in its normal position covers approximately half of the passage 24.

The tapered pin 16 rests on seat 17 thereby sealing off any fuel flow into the carburetor. Attached to the bottom of seat 17 is bushing 25 to which atomizer 26 is joined. Surrounding bushing 25 is air catch 27 and washer 28. Beneath seat 17 is air catch spring 29.

Tank 6 is mounted on the carburetor by inserting neck 32 into air intake side of carburetor 2. The operation of automatic valve 13 is as follows: Suction created by the movement of the pistons in the internal combustion engine is transmitted through the carburetor to the air intake of the carburetor which is disposed directly at the bottom of throat 9. As a result of such suction air flows downwardly through throat 9 and in its passage impinges against a flared air catch or riser 27 and washer 28 forcing them to move downwardly against the tension of spring 29. The downward motion of air catch 27 is transmitted to seat 17, thus pulling the seat away from the tapered pin 16. The greater the distance the air catch 27 moves downward, the larger the opening between the pin 16 and the seat 17, and naturally the greater quantity of fuel which flows therethrough. As it is well known the speed of the internal combustion engine controls the quantity of air intake and the degree of suction. Thus it is obvious that the flow of fuel will automatically vary with the speed of the engine. The air catch 27 is not limited to an open flared conical section but may be any impediment or obstruction of suitable construction upon which the flow of air through throat 9 impinges and causes to move downward.

An additional feature of this invention is the use of a special fuel atomizer 26, which in addition to having a center hole 31 has several slots 30 which cause the fuel to emit as a spray. The air rushing down through the bottom of throat 9, vaporizes and atomizes fuel released through atomizer 26 thereby premixing the air and fuel prior to its entrance into the carburetor. The air traversing the entire height of tank 6, through throat 9, has the additional function of cooling the fuel in tank 6.

Figure 3 is an elevational view taken on line 3—3 of Figure 2 and shows the fuel atomizer 26 with slots 30 and central orifice 31. Surrounding the fuel atomizer 26 is air catch 27 and encircling the whole is throat 9.

Figure 4 illustrates in more detail the construction of automatic valve 13. Bushing 22 is screwed into vertical hollow portion of casting 10. Shaft 15 extends down the center of bushing 22 with the tapered pin 16 resting on seat 17. Perforated tube 23 in the fuel containing portion of tank 6 conducts the fuel through a hollow side arm of casting 10 into a hollow central portion of casting 10. In normal position seat 17 partially blocks the entrance of fuel into the vertical hollow portion of casting 10. Disposed beneath seat 17 is riser spring 29, which when seat 17 is pulled downwardly causes compression on said spring. The strength of the spring is adjusted to respond to the pull of the pressure of air against the air catch 27 and washer 28. Bushing 25 is screwed to the end of seat 17. At the bottom of bushing 25 is atomizer 26 having slots 30 and orifice 31.

Utility and advantages of our emergency fuel tank will be obvious from the following description: Ordinarily the emergency fuel tank is filled with fuel and stored in the trunk of vehicle. When difficulties arise in the operation of the automobile such as lack of fuel, broken or clogged fuel line, defective fuel pump or vapor lock, the emergency tank can be easily and quickly put to use. This is accomplished by lifting off the air filter from the top of the carburetor and inserting in lieu thereof, in the same position the emergency fuel tank. To aid in starting the internal combustion engine, the tank is provided with a hand primer which can be manipulated by simply lifting the knob 14 which raises the tapered pin 16 from seat 17 on which it rests, and allows a charge of gasoline to flow down through the hollow portion of casting 10 through atomizer 30 into the carburetor. When knob 14 is released, spring 29 returns the shaft 15 to its normal closed position wherein the tapered pin 16 rests on seat 17. The automobile may now be started in the conventional manner by turning on the ignition and pressing down the starter. Once the automobile begins to operate, the suction caused by the pistons in the engine causes air to flow through the air intake side of the carburetor which is connected to the central throat 9 of tank 6. The flow of air downwardly through the throat of the tank impinges against the flared air catch 27 and washer 28. The force of air against the air catch causes the air catch to move downwardly responsive to the degree of suction. The air catch 27 is rigidly attached to bushing 25 which in turn is fastened to seat 17. The downward pull on the riser transmits a downward pull on the seat 17. Since the pin 16 is tapered, the greater distance the seat 17 moves downwardly the greater the opening between said seat and the tapered portion on pin 16, with consequently greater flow of gasoline therethrough. Thus it is seen the flow of gasoline is automatically responsive to speed of the engine desired.

As it is well known, the internal combustion engine generates considerable heat which frequently causes vaporization of gasoline with consequent difficulties of vapor lock and gasoline leakage. The tendency to vapor lock is minimized by the passage of air through throat 9, thereby cooling the contents of the tank and also assisting in the vaporization and atomization of the fuel just prior to its entrance into the carburetor.

We are aware tanks have been installed on carburetors which have fixed jets, and have found that such emergency tanks either inadequately supply the engine with fuel, or else supply too much fuel as to cause choking and "dying" of the engine. In our invention, only the amount of fuel required, depending upon the speed of the engine is fed into the cylinders of the internal combustion engine.

While we have shown and described one embodiment of our invention, this is illustrative only, and in no way limits the scope of our invention. Our invention is limited solely by and in the following claim, in which we wish to claim all novel features inherent therein.

We claim:

An emergency fuel tank adapted to be mounted on the air intake side of a carburetor of an internal combustion engine, comprising a tank having a throat centrally and vertically disposed through said tank, an outlet neck extending from the bottom of said throat adapted to be mounted on the air intake side of the careburetor, a bracket centrally disposed in said throat and affixed to the inside wall of said tank, said bracket having a hollow central section and a hollow side arm opening into the side wall of said tank for conducting fuel contained in the enclosed emergency tank to the hollow central section, a perforated tube extending upwardly in the body of fuel in said tank and connected at its bottom end to said hollow side arm, a vertical tube connected to and extending upwardly from said hollow central section, a movable vertical shaft disposed inside said vertical tube, a tapered pin connected to the lower end of said shaft, a movable valve seat on which said pin rests, a knob at the top of said vertical shaft for manually disengaging said pin from said valve seat, spring means in said vertical tube for retaining said shaft in normal closed position, spring means beneath said movable valve seat for retaining it in normal closed position, an atomizer connected to the bottom of said movable valve seat, and an air catch connected to said movable valve seat adapted to move said movable valve seat in response to the air flow through said throat.

ADOLPH N. CRISTOFANI.
JAMES R. RAGO.

REFERENCES CITED

The following references are of record in the file of this patent:

UNITED STATES PATENTS

| Number | Name | Date |
|---|---|---|
| 1,779,709 | Melkman | Oct. 28, 1930 |
| 1,972,686 | Lorenzen | Sept. 4, 1934 |
| 2,274,587 | Burton | Feb. 24, 1942 |
| 2,318,216 | Garretson | May 4, 1943 |
| 2,389,685 | Pike | Nov. 27, 1945 |